US009179332B2

United States Patent
Hammarwall et al.

(10) Patent No.: US 9,179,332 B2
(45) Date of Patent: Nov. 3, 2015

(54) ARTIFICIAL INTERFERENCE INJECTION FOR CHANNEL STATE INFORMATION REPORTING

(71) Applicants: David Hammarwall, Vallentuna (SE); Svante Bergman, Hägersten (SE); George Jöngren, Sundbyberg (SE)

(72) Inventors: David Hammarwall, Vallentuna (SE); Svante Bergman, Hägersten (SE); George Jöngren, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 207 days.

(21) Appl. No.: 13/877,920

(22) PCT Filed: Mar. 14, 2013

(86) PCT No.: PCT/SE2013/050249
§ 371 (c)(1),
(2) Date: Apr. 5, 2013

(87) PCT Pub. No.: WO2013/141784
PCT Pub. Date: Sep. 26, 2013

(65) Prior Publication Data
US 2014/0073313 A1    Mar. 13, 2014

Related U.S. Application Data

(60) Provisional application No. 61/612,914, filed on Mar. 19, 2012.

(51) Int. Cl.
*H04W 24/02* (2009.01)
*H04B 7/06* (2006.01)
(Continued)

(52) U.S. Cl.
CPC ............ *H04W 24/02* (2013.01); *H04B 7/0626* (2013.01); *H04L 1/0026* (2013.01); *H04B 7/024* (2013.01); *H04B 7/0417* (2013.01); *H04B 17/0085* (2013.01); *H04B 17/345* (2015.01)

(58) Field of Classification Search
CPC ... H04W 24/02; H04B 17/345; H04B 7/0626; H04B 17/0085; H04B 7/024; H04B 7/0417; H04L 1/0026
See application file for complete search history.

(56) References Cited

U.S. PATENT DOCUMENTS

2011/0319027 A1   12/2011   Sayana et al.
2012/0207043 A1   8/2012    Geirhofer et al.
(Continued)

FOREIGN PATENT DOCUMENTS

EP    2557834 A1    2/2013
WO    2011126025 A1   10/2011
WO    2013068924 A1   5/2013

OTHER PUBLICATIONS

LG Electronics, "Consideration in interference measurement for CoMP CSI feedback", 3GPP TSG RAN WG1 Meeting #68, Dresden, Germany, Feb. 6, 2012, pp. 1-6, R1-120436, 3GPP.
(Continued)

*Primary Examiner* — Chuong A Ngo
(74) *Attorney, Agent, or Firm* — Coats & Bennett, PLLC

(57) ABSTRACT

A system and method for improving the link adaptation in a wireless communication system is disclosed. User Equipment (UE) forms an interference hypothesis by amending a measured interference and noise by artificially injecting, to the measured interference and noise, interference corresponding to at least one emulated interfering isotropic signal that is virtually transmitted over an associated estimated effective channel. The UE further determines at least one channel state information (CSI) report based on the interference hypothesis, and transmits the CSI report to the network.

27 Claims, 6 Drawing Sheets

(51) Int. Cl.
*H04L 1/00* (2006.01)
*H04B 7/02* (2006.01)
*H04B 7/04* (2006.01)
*H04B 17/00* (2015.01)
*H04B 17/345* (2015.01)

(56) References Cited

U.S. PATENT DOCUMENTS

| | | | |
|---|---|---|---|
| 2012/0264441 A1 | 10/2012 | Chandrasekhar et al. | |
| 2013/0077518 A1 | 3/2013 | Abe et al. | |
| 2013/0088986 A1 | 4/2013 | Xiao et al. | |
| 2013/0114428 A1 | 5/2013 | Koivisto et al. | |
| 2013/0114430 A1 | 5/2013 | Koivisto et al. | |
| 2013/0114656 A1* | 5/2013 | Sayana | H04B 7/024 375/219 |
| 2013/0194951 A1 | 8/2013 | Kim et al. | |
| 2013/0223258 A1 | 8/2013 | Seo et al. | |
| 2014/0226575 A1 | 8/2014 | Davydov et al. | |

OTHER PUBLICATIONS

Ericsson, et al., "CQI Definition of UE Emulated Intra CoMP Cluster Interference", 3GPP TSG-RAN WG1#69, Prague, Czech Republic, May 21, 2012, pp. 1-3, R1-122837, 3GPP.

Ericsson, et al., CSI Feedback Operation for CoMP, 3GPP TSG-RAN WG1 #68, Dresden, Germany, Feb. 6, 2012, pp. 1-4, R1-120784, 3GPP.

Renesas Mobile Europe Ltd., "Feedback operation for coordinated multi-point operation", 3GPP TSG RAN WG1 Meeting #67, San Francisco, USA, Nov. 14, 2011, pp. 1-4, R1-113892, XP50561972, 3rd Generation Partnership Project, France.

Panasonic, "CQI Definitions for CoMP", 3GPP TSG RAN WG1 Meeting #68,Dresden, Germany, Feb. 6, 2012, pp. 1-3, R1-120224, XP50562781, 3rd Generation Partnership Project, France.

Barbieri A., et al., "Coordinated Downlink Multi-Point Communications in Heterogeneous Cellular Networks", Information Theory and Applications Workshop (ITA), Feb. 5, 2012, San Diego, CA, pp. 7-16, XP32162910, IEEE.

Ericsson, et al., "Implicit CSI Feedback Framework for DL CoMP", 3GPP TSG RAN WG1 #68bis, Jeju, Korea, Mar. 26, 2012, pp. 1-7, R1-121739, XP50599993, 3rd Generation Partnership Project, France.

Catt, "Implicit Feedback in Support of Downlink CoMP", 3GPP TSG RAN WG1 meeting #58bis, Miyazaki, Japan, Oct. 12, 2009, pp. 1-4, R1-094141, XP50388612, 3rd Generation Partnership Project, France.

* cited by examiner

ARTIFICIAL INTERFERENCE INJECTION FOR CHANNEL STATE INFORMATION REPORTING

RELATED APPLICATIONS

This application claims priority from U.S. Provisional Application Ser. No. 61/612,914 entitled, "Artificial Interference Injection for Channel State Information (CSI) Reporting." The '914 application was filed on Mar. 19, 2012 and is expressly incorporated herein by reference in its entirety.

FIELD OF THE INVENTION

The present disclosure relates generally to wireless communications systems, and in particular to systems and methods for improving the link adaptation in a wireless communications system.

BACKGROUND

Multi-antenna techniques can significantly increase the data rates and reliability of a wireless communications system. The performance is particularly improved if both the transmitter and the receiver are equipped with multiple antennas, which results in a multiple-input multiple-output (MIMO) communication channel. Such systems and/or related techniques are commonly referred to as "MIMO."

The Long Term Evolution (LTE) standard, which is a standard defined by the Third Generation Partnership Project (3GPP), is currently evolving with enhanced MIMO support. A core component in LTE is the support of MIMO antenna deployments and MIMO related techniques. A current working assumption in LTE-Advanced is the support of an eight-layer spatial multiplexing mode, possibly with channel dependent precoding. The focus of this spatial multiplexing mode is to achieve high data rates in favorable channel conditions. An illustration of the transmission structure of the precoded spatial multiplexing mode is provided in FIG. 1.

As seen in FIG. 1, the information carrying symbol vector s is multiplied by an $N_T \times r$ precoder matrix $W_{N_T \times r}$, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI). The PMI specifies a unique precoder matrix in the codebook. If the precoder matrix is confined to have orthonormal columns, then the design of the codebook of precoder matrices corresponds to a Grassmannian subspace packing problem. Each of the r symbols in s corresponds to a layer, and r is referred to as the transmission rank. In this way, spatial multiplexing is achieved since multiple symbols can be transmitted simultaneously over the same resource element (RE). The number of symbols $r$ is typically adapted to suit the current channel properties.

LTE uses Orthogonal Frequency-Division Multiplexing (OFDM) in the downlink, and Discrete Fourier Transform (DFT) precoded OFDM in the uplink. Therefore, the received $N_R \times 1$ vector $y_n$ for a certain resource element on subcarrier n (or alternatively, data RE number n), assuming no inter-cell interference, is thus modeled by Equation (1)

$$y_n = H_n W_{N_T \times r} s_n + e_n \quad (1)$$

where $e_n$ is a noise and interference vector obtained as realizations of a random process. The precoder, $W_{N_T \times r}$, can be a wideband precoder, which is constant over frequency, or frequency selective.

The precoder matrix is often selected to match the characteristics of the $N_R \times N_T$ MIMO channel H, resulting in so-called channel dependent precoding. This is also commonly referred to as closed-loop precoding and essentially strives for focusing the transmit energy into a subspace that is strong in the sense of conveying much of the transmitted energy to the UE. Additionally, the precoder matrix may also be selected to strive for orthogonalizing the channel. This means that the inter-layer interference is reduced after proper linear equalization at the UE.

Channel State Information Reference Symbols (CSI-RS)

In LTE Release-10, a new reference symbol sequence (i.e., the CSI-RS) was introduced to estimate channel state information. The CSI-RS provides multiple advantages over basing the CSI feedback on the common reference symbols (CRS), which previous releases of LTE used for that purpose. First, because the CSI-RS is not used for demodulation of the data signal, it does not require the same density (i.e., the overhead of the CSI-RS is substantially less). Second, the CSI-RS provides a much more flexible means to configure CSI feedback measurements, such as which CSI-RS resource to measure on can be configured in a UE specific manner. Moreover, the support of antenna configurations larger than four (4) antennas must resort to CSI-RS, since the CRS is only defined for, at most, four (4) antennas.

By measuring on a CSI-RS, a UE can estimate the effective channel the CSI-RS is traversing including the radio propagation channel, antenna gains, and any possible antenna virtualizations (i.e., a CSI-RS port may be precoded so that it is virtualized over multiple physical antenna ports; that is, the CSI-RS port can be transmitted on multiple physical antenna ports, possibly with different gains and phases). In more mathematical rigor, this implies that if a known CSI-RS signal $x_n$ is transmitted, a UE can estimate the coupling between the transmitted signal and the received signal (i.e., the effective channel). Therefore, if no virtualization is performed in the transmission, $$y_n = H_n x_n + e_n$$

That is, the UE can measure the effective channel $H_{eff} = H_n$. Similarly, if the CSI-RS is virtualized using a precoder $W_{N_T \times r}$ as $$y_n = H_n W_{N_T \times r} x_n + e_n,$$

then the UE can estimate the effective channel $$H_{eff} = H_n W_{N_T \times r}.$$

Related to CSI-RS is the concept of zero-power CSI-RS resources (also known as a muted CSI-RS). Zero-power CSI-RS resources are configured just as regular CSI-RS resources, so that a UE knows that the data transmission is mapped around those resources. The intent of the zero-power CSI-RS resources is to enable the network to mute the transmission on the corresponding resources as to boost the SINR of a corresponding non-zero power CSI-RS, possibly transmitted in a neighbor cell/transmission point. For LTE-Release 11, a special zero-power CSI-RS that a UE is mandated to use for measuring interference plus noise is being discussed. As the name indicates, a UE can assume that the TPs of interest are not transmitting on the muted CSI-RS resource, and that the received power can be used as a measure of the interference plus noise level.

Based on a specified CSI-RS resource and an interference measurement configuration (e.g. a muted CSI-RS resource), the UE can estimate the effective channel and noise plus interference, and consequently also determine which rank, precoder, and transport format to recommend that best match the particular channel.

Implicit CSI Feedback

For CSI feedback, LTE has adopted an implicit CSI mechanism where a UE does not explicitly report, e.g., the complex valued elements of a measured effective channel, but rather, recommends a transmission configuration for the measured effective channel. The recommended transmission configuration thus implicitly gives information about the underlying channel state.

In Releases 8 and 9 of LTE, the CSI feedback is given in terms of a transmission rank indicator (RI), a precoder matrix indicator (PMI), and channel quality indicator(s) (CQI). The CQI/RI/PMI report can be wideband or frequency selective depending on which reporting mode that is configured.

The RI corresponds to a recommended number of streams that are to be spatially multiplexed and thus transmitted in parallel over the effective channel. The PMI identifies a recommended precoder (in a codebook) for the transmission, which relates to the spatial characteristics of the effective channel. The CQI represents a recommended transport block size (i.e., coderate). Thus, there is a relation between a CQI and an SINR of the spatial stream(s) over which the transport block is transmitted.

The implicit feedback framework has many advantages over more explicit feedback, most notably:

The UE implementation becomes, to a large extent, transparent to the reporting mechanism and the testing thereof;

It encourages advanced/effective receiver implementation since such UEs can report higher CQI and/or higher transmission rank, and as such, immediately benefit from the added implementation effort. Such advanced receiver designs include, but are not limited to:
Increased number of UE receive antennas;
Advanced interference suppression techniques; and
Advanced channel estimation for demodulation and CSI reporting Explicit CSI feedback has the disadvantage that the UE receiver implementation is typically not included in the reporting, and it becomes increasingly difficult for the network/UE to manage/utilize different UE receiver implementations. Moreover, it is generally more difficult to provide effective interoperability testing for such CSI feedback mechanisms.

Note that in some contexts, a CQI is interpreted to mean SINR, but that is not the proper definition in LTE contexts. Most notably, reporting an SINR corresponds to the category of explicit CSI, whereas CQI, as defined above, fall in the implicit CSI category.

Coordinated Multipoint (CoMP) Transmission

Coordinated Multipoint (CoMP) transmission and reception refers to a system where the transmission and/or reception at multiple, geographically separated antenna sites is coordinated in order to improve system performance. More specifically, CoMP refers to coordination of antenna arrays that have different geographical coverage areas.

In the subsequent discussion we refer to an antenna covering a certain geographical area as a point, or more specifically as a Transmission Point (TP). The coordination can either be distributed, by means of direct communication between the different sites, or by means of a central coordinating node.

CoMP is a tool introduced in LTE to improve the coverage of high data rates, the cell-edge throughput, and/or to increase system throughput. Particularly, the goal is to distribute the user perceived performance more evenly in the network by controlling the interference in the system, either by reducing the interference and/or by predicting the interference more accurately.

CoMP operation targets many different deployments. These include coordination between sites and sectors in cellular macro deployments, as well as different configurations of Heterogeneous deployments, where, for instance, a macro node coordinates the transmission with pico nodes within the macro coverage area.

Further, there are many different CoMP transmission schemes that are considered. For example, Dynamic Point Blanking: Dynamic Point Blanking is where multiple transmission points coordinate the transmission so that neighboring transmission points may mute the transmissions on the time-frequency resources (TFREs) that are allocated to UEs that experience significant interference.

Dynamic Point Selection: Dynamic Point Selection is where the data transmission to a UE may switch dynamically (in time and frequency) between different transmission points, so that the transmission points are fully utilized.

Coordinated Beamforming: Coordinated Beamforming is where the TPs coordinate the transmissions in the spatial domain by beamforming the transmission power in such a way that the interference to UEs served by neighboring TPs are suppressed.

Joint Transmission: Joint Transmission is where the signal to a UE is simultaneously transmitted from multiple TPs on the same time/frequency resource. The aim of joint transmission is to increase the received signal power and/or reduce the received interference (if the cooperating TPs otherwise would serve some other UEs without taking our JT UE into consideration).

CoMP Feedback

A common denominator for the CoMP transmission schemes is that the network needs CSI information not only for the serving TP, but also for the channels linking the neighboring TPs to a terminal. For example, by configuring a unique CSI-RS resource per TP, a UE can resolve the effective channels for each TP by measurements on the corresponding CSI-RS. A CSI-RS resource can loosely be described as the pattern of resource elements on which a particular CSI-RS configuration is transmitted. A CSI-RS resource is determined by a combination of "resourceConfig", "subframeConfig", and "antennaPortsCount", which are configured by RRC signaling. The UE is likely unaware of the physical presence of a particular TP. It is only configured to measure on a particular CSI-RS resource, without knowing of any association between the CSI-RS resource and a TP.

A few candidates for CoMP feedback are being considered for LTE-Release 11. Most alternatives are based on per CSI-RS resource feedback, possibly with CQI aggregation of multiple CSI-RS resources, and possibly with some sort of co-phasing information between CSI-RS resources. The following list briefly introduces a few relevant alternatives (note that a combination of the alternatives is also possible):

Per CSI-RS resource feedback corresponds to separate reporting of channel state information (CSI) for each of a set of CSI-RS resources. Such a CSI report could, for example, correspond to a Precoder Matrix Indicator (PMI), a Rank Indicator (RI), and/or a Channel Quality Indicator (CQI), which represent a recommended configuration for a hypothetical downlink transmission over the same antennas used for the associated CSI-RS (or as the RS used for the channel measurement). More generally, the recommended transmission should be mapped to physical antennas in the same way as the reference symbols used for the CSI channel measurement. Additionally, there could be interdependencies between the CSI reports. For example, they could be constrained to have the same RI.

Typically there is a one-to-one mapping between a CSI-RS and a TP, in which case per CSI-RS resource feedback corresponds to per-TP feedback; that is, a separate PMI/RI/CQI is reported for each TP.

Additionally, the considered CSI-RS resources are configured by the eNodeB as the CoMP Measurement Set.

Aggregate feedback corresponds to a CSI report for a channel that corresponds to an aggregation of multiple CSI-RS. For example, a joint PMI/RI/CQI can be recommended for a joint transmission over all antennas associated with the multiple CSI-RS.

A joint search may however be too computationally demanding for the UE, and a simplified form of aggregation is to evaluate an aggregate CQI and RI, which are combined with per CSI-RS resource PMIs. Such a scheme also has the advantage that the aggregated feedback may share much information with a per CSI-RS resource feedback. This is beneficial because many CoMP transmission schemes require per CSI-RS resource feedback, and to enable eNodeB flexibility in dynamically selecting CoMP scheme, aggregated feedback would typically be transmitted in parallel with per CSI-RS resource feedback. To support coherent joint transmission, such per CSI-RS resource PMIs can be augmented with co-phasing information enabling the eNodeB to rotate the per CSI-RS resource PMIs so that the signals coherently combine at the receiver.

Interference Measurements for CoMP

For efficient CoMP operation, it is equally important to capture appropriate interference assumptions when determining the CQIs as it is to capture the appropriate received desired signal. In uncoordinated systems the UE can effectively measure the interference observed from all other TPs (or all other cells), which will be the relevant interference level in an upcoming data transmission. Such interference measurements are typically performed by analyzing the residual interference on CRS resources (after the UE subtracts the impact of the CRS signal).

In coordinated systems performing CoMP such interference measurements becomes increasingly irrelevant. Most notably, within a coordination cluster, an eNodeB can to a large extent control which TPs that interferes with a UE in any particular TFRE. Therefore, there will be multiple interference hypotheses depending on which TPs are transmitting data to other terminals.

For the purpose of improved interference measurements, new functionality is introduced in LTE-Release 11, where the agreement is that the network will be able to configure which particular TFREs are to be used for interference measurements for a particular UE. The network can thus control the interference seen on those TFREs by muting all TPs within a coordination cluster on those TFREs, for example, in which case the terminal will effectively measure the inter CoMP cluster interference.

Moreover, take for example a dynamic point blanking scheme where there are at least two relevant interference hypotheses for a particular UE. In one interference hypothesis, the UE sees no interference from the coordinated transmission point. In the other hypothesis, the UE sees interference from the neighboring point. To enable the network to effectively determine whether a TP should be muted, the UE can report two (or generally multiple) CQIs corresponding to different interference hypotheses.

To facilitate such a scheme it has been proposed to configure multiple distinct sets of interference measurement TFREs, wherein the network is responsible for realizing each relevant interference hypothesis in one of these sets of TFREs. Hence, by associating a particular reported CQI with a particular set of TFREs the relevant CQIs can be made available to the network for effective scheduling.

Alternatively, the eNodeB can perform post processing on a reported CQI as to estimate the relevant CQIs for the relevant interference hypotheses.

As mentioned above, it is essential that an eNodeB can accurately evaluate the performance of a UE given different CoMP transmission hypotheses. Otherwise, the dynamic coordination becomes meaningless. However, the current state-of-the art solutions for interference estimation all have severe limitations and drawbacks. For example:

- eNodeB post processing of a CQI to compensate for different interference hypothesis is, in practice, a very challenging task, especially when the interference operating point changes radically for different CoMP transmission hypotheses.
- A recommended RI, PMI, and associated CQI(s) are integrally interdependent. Therefore, if a UE performs recommendations based on an incorrect interference assumption, it will also affect the transmission rank and PMI recommendations. If the UE for example overestimates the interference, the recommended RI (and associated PMI) will have too low of a rank and not reflect the optimal transmission.
- Moreover, for an eNodeB to increase the transmission rank over the recommendation becomes volatile, since there is no spatial information or CQI provided by an associated high rank PMI for the added streams. Moreover, it is often very difficult for an eNodeB to accurately determine the interference impact of a particular TP on a UE. In practice, only coarse wideband corrections can be made based on, for example, mobility measurement reports from the UE.
- Multiple sets of TFREs for interference measurements can also be used to improve a CQI for a CoMP transmission hypothesis, by assigning a corresponding set of interference measurement TFREs that experience a similar interference patterns. However, each such set of TFREs is associated with overhead in the downlink, since the corresponding TFREs will typically be muted for data. The overhead thus increases linearly with the number of interference measurement TFRE sets.
- Moreover, the in practice there can be very many different interference hypotheses that need to be evaluated within a CoMP cluster. Particularly, the number of possible intra CoMP cluster interference hypotheses increase exponentially with the number of coordinated TPs.
- Explicit feedback is another option for CoMP feedback, wherein the UE would feed back the actual elements of multiple effective channels, thereby providing a means for the eNodeB to accurately determine the interference seen by different terminals from the different TPs. Explicit feedback does, however, have severe disadvantages including:

excessive overhead;
challenging with accurate interoperability testing; and
difficulties to take advantage of advanced receiver designs

SUMMARY

Accordingly, the present disclosure provides a system and method for improving the link adaptation in a wireless communication system. In one embodiment, the method is performed at a User Equipment (UE). Particularly, the UE measures interference on a set of time-frequency resources (TFREs) configured by an eNodeB. The UE then injects at least one emulated interference signal into the measured interference to form a modified measured interference, and determines a first Channel State Information (CSI) report based in part on the modified measured interference. Once determined, the UE sends the first CSI report to the eNodeB.

In another embodiment, the present disclosure provides a UE configured to improve link adaptation in a wireless communication system. The UE comprises a communications interface and a programmable controller. The communications interface is configured to receive a reference signal transmitted by a plurality of transmission points (TPs), over an effective channel using a set of time-frequency resources (TFREs), configured by an eNodeB. In this embodiment, the eNodeB mutes a first TP on the set of TFREs. The programmable controller is configured to measure interference on the set of TFREs configured by the eNodeB, inject at least one emulated interference signal into the measured interference to generate or form a modified measured interference, determine a first Channel State Information (CSI) report based on the modified interference, and send the first CSI report to the eNodeB.

In another embodiment, the present disclosure provides a method for improving link adaptation in a wireless communication system. The method is performed at an eNodeB and comprises muting one or more transmission points on a set of time-frequency resources (TFREs), wherein a UE has been configured to measure interference on the set of TFREs. The eNodeB then transmits at least one distinct reference signal from at least one of the transmission points, and configures the UE to inject emulated interference signals into the measured interference based on a virtual transmission over the estimated effective channel specified by the transmitted distinct reference signal to report Channel State Information (CSI).

The present disclosure further provides an eNodeB configured to improve link adaptation in a wireless communication system. In at least one embodiment, the eNodeB comprises a communications interface and a programmable controller. The communications interface is configured to allow the eNodeB to communicate with a UE via the wireless communication system. The programmable controller, which is operatively coupled to the communication interface, is configured to mute one or more transmission points (TPs) on a set of time-frequency resources (TFREs), on which the UE has been configured to measure interference, transmit at least one distinct reference signal from at least one of the TPs, and configure the UE to inject at least one emulated interference signal into the measured interference based on a virtual transmission over the at least one effective channel that is specified by the at least one transmitted distinct reference signal, to report Channel State Information (CSI).

The present disclosure provides advantages that conventional systems and methods are not able to provide. For example, the present disclosure enables very flexible interference hypotheses. Additionally, the frequency selectivity and spatial characteristics of the interference may be implicitly accounted for by the terminal in the implicit reporting, thereby facilitating for UEs with advanced receivers to benefit from improved CSI reporting. In addition, the present disclosure minimizes overhead, since a particular interference measurement resource can be share by more UEs and/or CQI hypotheses. Further, the present disclosure also allows for large coordination clusters.

Of course, those skilled in the art will appreciate that the present disclosure is not limited to the above contexts or examples, and will recognize additional features and advantages upon reading the following detailed description and upon viewing the accompanying drawings.

DETAILED DESCRIPTION

Figure 1:
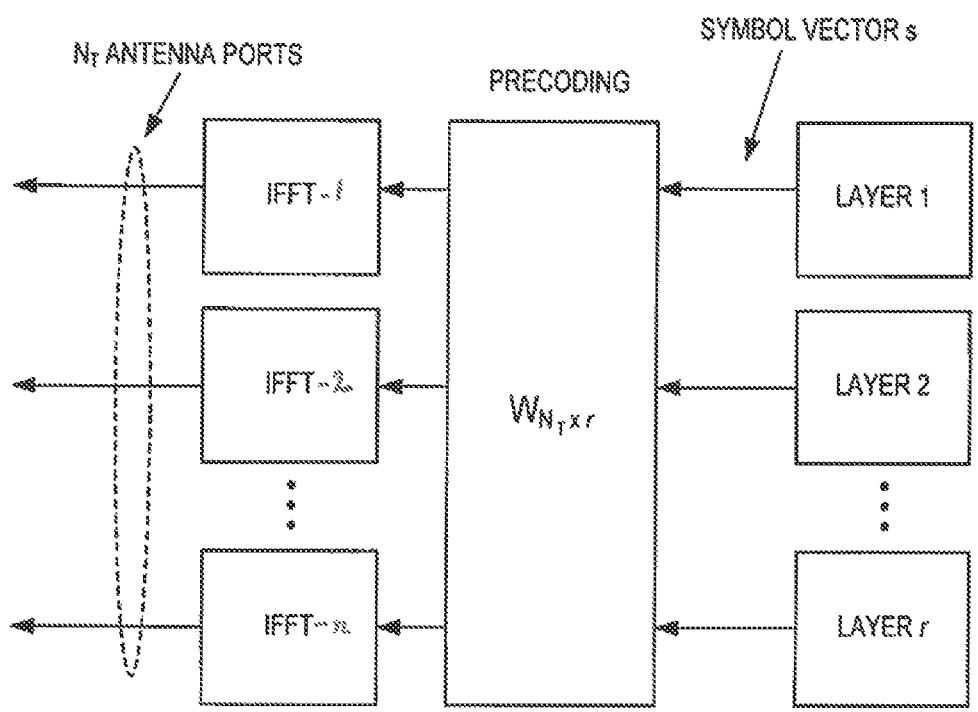
FIG. 1 is a block diagram illustrating the transmission structure of precoded spatial multiplexing mode in LTE.
Figure 2:
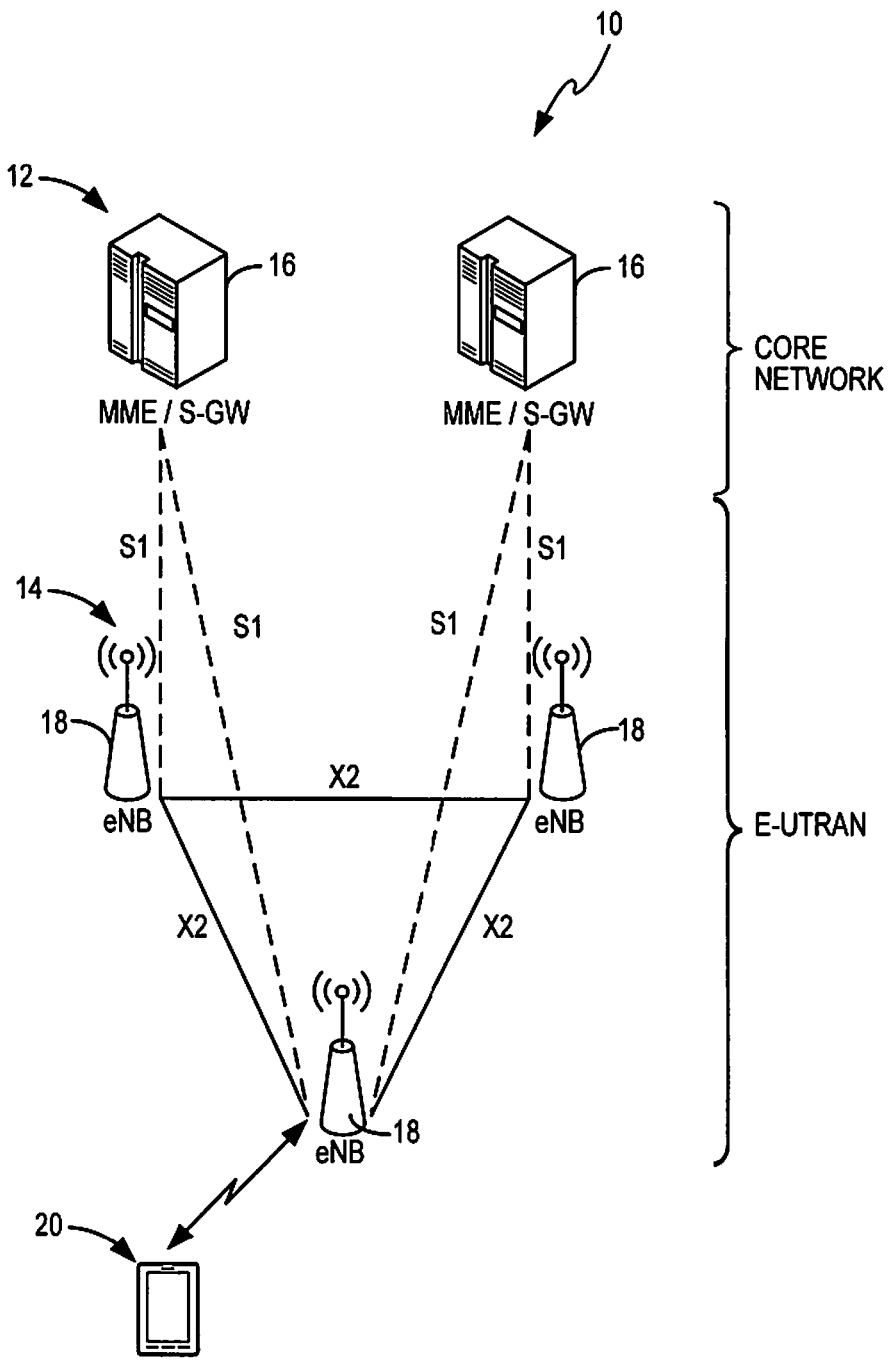
FIG. 2 is a functional block diagram of a LTE network.

Turning now to the figures, a representative example of a modern wireless communication network standard is the Long Term Evolution (LTE), defined by the Third Generation Partnership Project (3GPP). FIG. 2 illustrates a functional block diagram of a LTE network 10, including a core network 12 (i.e., the evolved packet core) and a Radio Access network 14 (i.e., the Evolved Universal Terrestrial Radio Access Network, or E-UTRAN). The evolved packet core network 12 comprises a plurality of nodes 16 including those having the functionality of a Mobile Management Entity (MME) and a Signaling Gateway (S-GW). The E-UTRAN nodes include evolved Node B's (eNodeB) 18 that communicatively connect to each other over the logical X2 interface and to the MME/SGWs nodes 16 over the logical S1 interface. Additionally, the eNodeBs 18 also communicate with one or more user terminals, referred to herein as User Equipment (UE) 20, over an air interface to provide the UEs 20 with access to the evolved packet core network 12.

As previously stated, an integral part of the link adaptation for a CoMP system is for UEs to accurately recommend CSI relevant for the CoMP transmission hypothesis at hand. In one embodiment, an eNodeB configures a set of TFREs for interference measurement by the UE, wherein at least a first transmission point is muted. Therefore, the UE will not include any interference from the first transmission point when estimating a residual noise and interference. The residual noise and interference is typically characterized as a complex valued Gaussian random process, $$e_n \in CN(0, Q_e),$$

where $Q_e$ is the correlation matrix, and the elements of $e_n$ correspond to an interference realization on each of the receive antennas. The correlation matrix, $Q_e$, may be estimated as wideband or frequency selective depending on UE implementation.

In practice the residual noise will not fully constitute a complex Gaussian distribution, since a large fraction will not originate from thermal noise, but rather, from multiple quadrature amplitude modulated (QAM) interfering signals. However, from the law of large numbers, the aggregated interference will typically be accurately modeled as a Gaussian distribution. However, in a more general embodiment the residual interference may be modeled using any probability distribution, which may more accurately model the interference that complies with the correlation matrix $Q_e$. Moreover, the UE estimates an effective channel $H_{\textit{eff}}$ from reference signals transmitted from the coordinated node.

Further, the UE amends the measured interference, characterized by $Q_e$, by injecting artificial interference over the effective channel and forms an interference hypothesis as $$\tilde{e}_n = e_n + H_{\textit{eff}} q_n, \quad (2)$$

where $q_n$ is an isotropic random signal of a specific nominal power. In this context, an isotropic signal refers to a signal that equally excites all dimensions of the effective channel—e.g., where the elements of $q_n$ are independently identically distributed, or are constructed to be orthogonal in time and/or frequency.

In one such embodiment the elements of $q_n$ are assumed to be from a QAM alphabet; for example, modulated as BPSK, QPSK, 16 QAM, or 64 QAM. In another such embodiment the elements of $q_n$ are modeled to have a complex valued Gaussian distribution.

The UE next determines an implicit CSI report, for example a PMI/CQI/RI recommendation, assuming the interference model for $\tilde{e}_n$ in place of $e_n$, and reports the implicit CSI to the network. The network is therefore provided with an implicit CSI report that is valid when the UE receives interference from the coordinated node, even though this interference was not present in the interference measurement performed by the UE.

In one such embodiment, the UE takes the receiver interference suppression capability into account when determining the implicit CSI report. This is useful because advanced receivers may immediately benefit by reporting CSI (e.g., CQI) that better reflects the performance of the receiver processing.

In another embodiment the UE determines a second implicit CSI report, based on the interference hypothesis $e_n$, and reports the implicit CSI to the network. The network is therefore in addition provided with a CSI report that is valid when the UE does not receive interference from the coordinated node. Accordingly, the same set of TFREs may be used by the terminal for both CSI reports (that for example correspond to two different CoMP transmission hypotheses).

In one embodiment, $H_{\textit{eff}}$ is frequency selective.

In one embodiment, the amended interference hypothesis is modeled, by the terminal, as a complex valued Gaussian process $$\tilde{e}_n \in CN(0, \tilde{Q}_n),$$

wherein $$\tilde{Q}_n = Q_n + P Q_{H_{\textit{eff}}}$$

and P is the power of each element in $q_n$ and $$Q_{H_{\textit{eff}}} = E(H_{\textit{eff}} H_{\textit{eff}}^H) \quad (3)$$

wherein $E(\cdot)$ denotes the expected or average value taken over some time-frequency window.

In a more general embodiment, $\tilde{e}_n$ is modeled with a probability distribution that complies with the correlation matrix $Q_{H_{\textit{eff}}}$ in Equation (3).

In one embodiment, the additional interference is modeled as frequency selective, wherein $$Q_{H_{\textit{eff}}} = H_{\textit{eff}} H_{\textit{eff}}^H.$$

In another such embodiment, the additional interference is modeled as wideband, wherein the expectation/averaging in Equation (3) is taken over the full bandwidth.

In one embodiment, the interference hypothesis is amended with a plurality of emulated interfering isotropic signals that each is virtually transmitted over an associated estimated effective channel.

In another embodiment, an eNodeB configures a UE to add at least one virtual interference signal from an effective channel of a specific reference signal for a specific implicit CSI report.

In another embodiment, the specific reference signal is restricted to belong to a CoMP Measurement Set. This embodiment has the advantage that the UE most likely has to estimate the effective channel for the specific reference signal for other purposes, and as such, the virtual interference may be added with very limited additional computational complexity. Typically, a UE will provide CSI for all reference signals (and hence implicitly TPs) in the CoMP Measurement Set which requires estimating an effective channel.

In another embodiment, the amended interference hypothesis is only applied for determining of parts of the CSI report. For example, the amended interference may only be used for determining RI, or PMI, or CQI, or a combination of any two of the three.

In another embodiment a plurality of distinct interference hypotheses are used to determine different elements of the CSI report, wherein each interference hypothesis corresponds to a different artificial interference injection configuration and/or a different residual interference measurement. For example, a RI may be determined using a first interference hypothesis, whereas corresponding PMI and CQI are determined using a second interference hypothesis. Alternatively, the RI and PMI may be determined using a first interference hypothesis, and CQI may be determined using a second interference hypothesis. Further, note that a subset of the interference injection configurations could correspond to no artificial interference injection.

In another embodiment, the power measurement offset, e.g., Pc in case of CSI-RS in LTE, is separately configurable for adding virtual interference and for estimating the effective channel of a desired signal using the ports associated with the reference signal.

In one embodiment, an eNodeB configures at least one coordinated transmit point to be muted on a specific set of TFREs. Moreover, the eNodeB configures a specific UE to measure a residual interference on the TFREs. Further, the UE reports at least one implicit CSI report, wherein the CSI report was derived assuming the virtual interference hypothesis wherein the residual interference is amended by injecting artificial interference corresponding to an emulated interfering isotropic signal that is virtually transmitted over an effective channel estimated from reference signals transmitted from the coordinated transmit point.

In another embodiment, an eNodeB mutes all coordinated transmission points on the specific set of TFREs. Moreover, the specific UE reports a plurality of implicit CSI reports, each corresponding to a particular CoMP transmission hypothesis, wherein in each such CSI hypothesis, all interference from transmission points within the coordinated cluster that is present for the associated CoMP transmission hypothesis is artificially injected by the UE.

Figure 3:
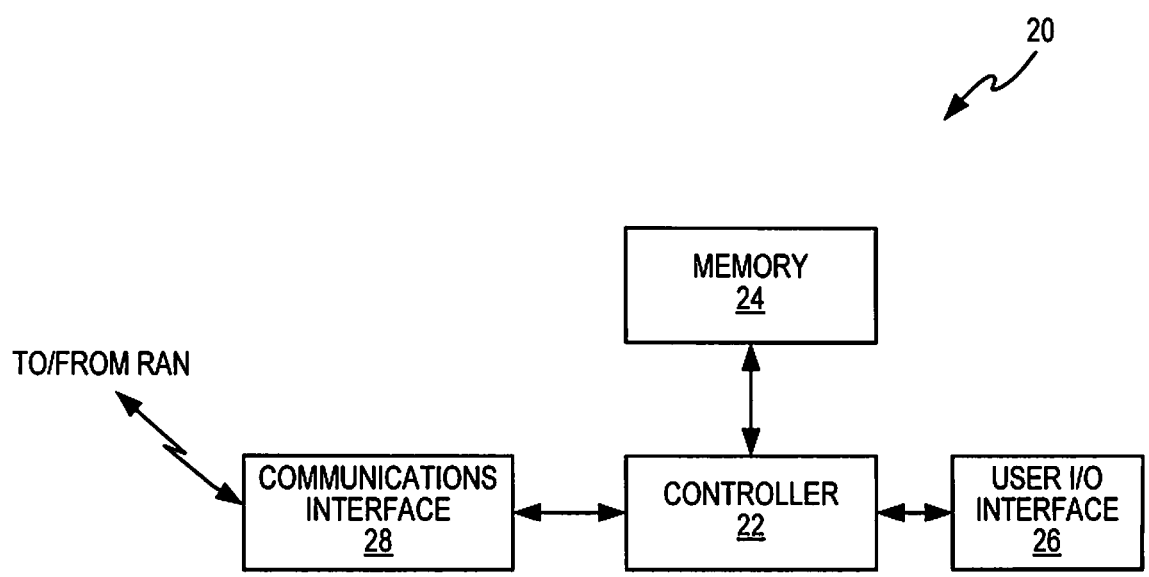
FIG. 3 is a functional block diagram of a User Equipment configured according to one embodiment of the present disclosure.

FIG. 3 is a functional block diagram illustrating some components of an exemplary UE 20 configured to operate according to one or more embodiments of the present disclosure. As seen in FIG. 3, UE 20 comprises a programmable controller 22, a memory 24, a user I/O interface 26, and a communications interface 28. The user I/O interface 26 provides the components necessary for a user to interact with the UE 20. The communications interface 28 comprises a transceiver that facilitates the communications with the eNodeBs 18 of the E-UTRAN over the appropriate air interface. In one embodiment, the communications interface communicates signals and data with the eNodeBs 18 in accordance with the LTE standards. The memory 24 may comprise any solid state memory or computer readable media known in the art. Suitable examples of such media include, but are not limited to, ROM, DRAM, Flash, or a device capable of reading computer-readable media, such as optical or magnetic media.

The programmable controller 22 may be implemented by one or more microprocessors, hardware, firmware, or a combination thereof, and generally controls the operation and functions of the UE 20 according to the appropriate standards. Such operations and functions include, but are not limited to, communicating with the eNodeBs 18 as previously described in this application. In this regard, the programmable controller 22 may be configured to implement logic and instructions stored in memory 24 to perform the method of the present disclosure to improve the link adaptation.

Figure 4:
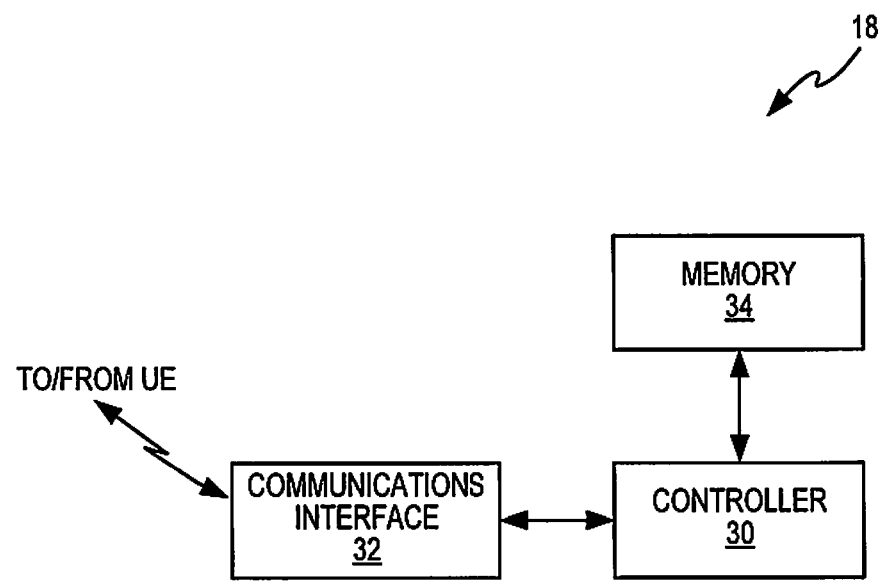
FIG. 4 is a functional block diagram of an eNodeB configured according to one embodiment of the present disclosure.

FIG. 4 is a functional block diagram of some components of an eNodeB 18 configured according to one embodiment of the present disclosure. As shown in FIG. 4, the eNodeB 18 comprises a programmable controller 30, a communications interface 32, and a memory 34. The communications interface 32 may, for example, comprise a transmitter and receiver configured to operate in an LTE system or other similar system. As is known in the art, the transmitter and receiver are coupled to one or more antennas (not shown) and communicate with the UE 20 over the LTE-based air interface. Memory 34 may comprise any solid state memory or computer readable media known in the art. Suitable examples of such media include, but are not limited to, ROM, DRAM, Flash, or a device capable of reading computer-readable media, such as optical or magnetic media.

The programmable controller 30 controls the operation of the eNodeB 18 in accordance with the LTE standard. The functions of the controller 30 may be implemented by one or more microprocessors, hardware, firmware, or a combination thereof, and include performing the functions previously described. Thus, the controller 30 may be configured to according to logic and instructions stored in memory 34 to communicate with the UE 20, as well as to improve the link adaptation using the method previously described.

Figure 5:
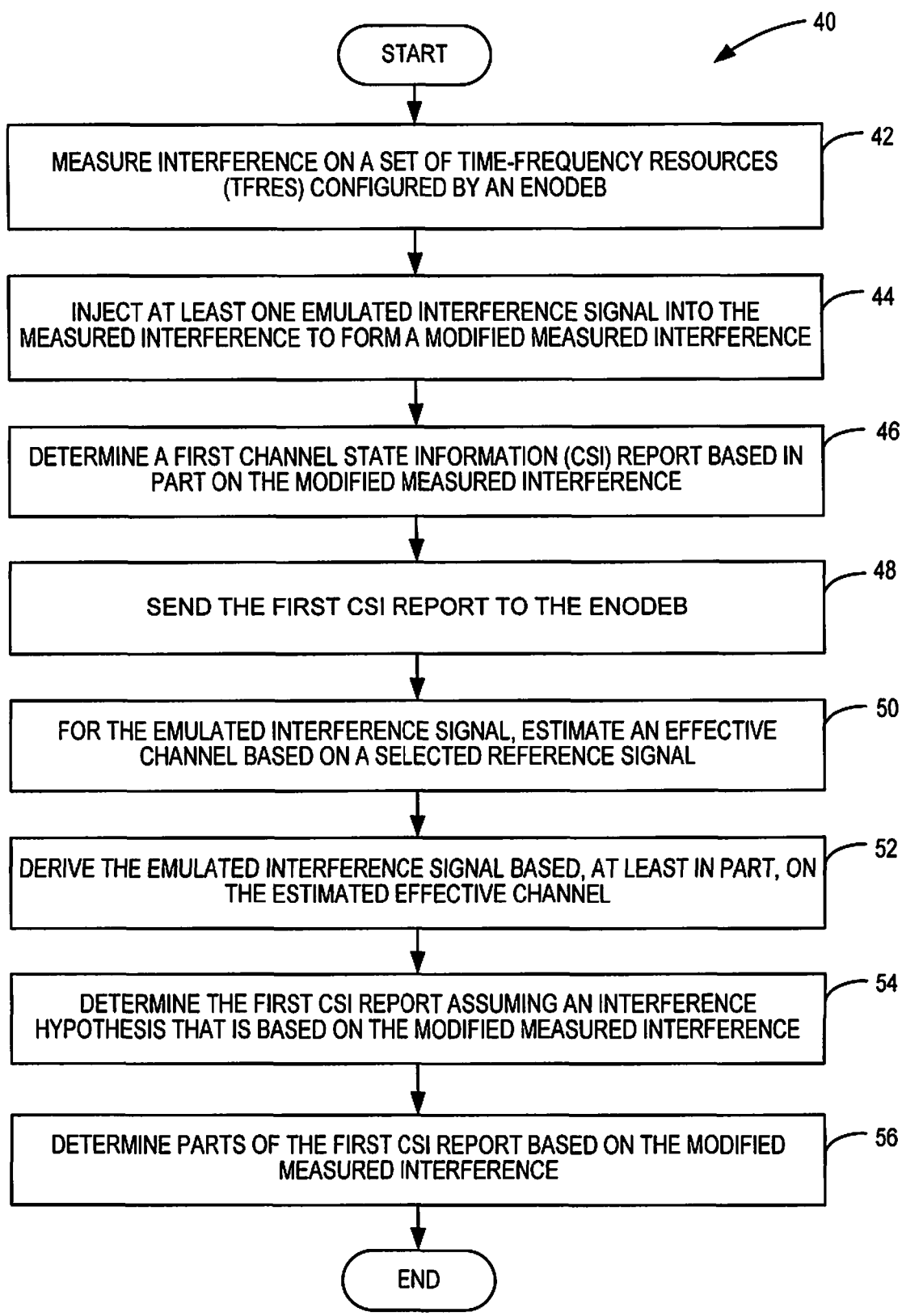
FIG. 5 is a flow diagram illustrating a method for improving link adaptation in a wireless communications system according to one embodiment of the present disclosure.

FIG. 5 is a flow diagram illustrating a method 40 for improving link adaptation in a wireless communications system, such as system 10. Method 40 is performed at the UE 20 and begins with the UE 20 receiving and measuring interference on a set of time-frequency resources (TFREs) configured by an eNodeB 18 (box 42). A first of the TPs may be muted by the eNodeB 18 so that the interference measured by the UE 20 does not include any of the interference that is caused by the first TP. The UE 20 may also, for example, estimate the effective channel based on a reference signal transmitted by one or more TPs. In one embodiment, the effective channel is frequency selective.

The UE 20 then injects at least one emulated interference signal into the measured interference to form a modified measured interference (box 44). The emulated interference signal, in one embodiment, comprises a virtual transmission of an isotropic random signal over the associated effective channel. Additionally, the virtual transmission may have an indicated nominal power.

Once the UE 20 generates or forms the modified interference measurement, the UE 20 determines a first CSI report, which may or may not be an implicit CSI report, based in part on the modified measured interference (box 46) and sends the report to the eNodeB 18 (box 48). Those skilled in the art should appreciate that the UE 20 is not limited only to determining the first CSI based in part on the modified measured interference report, however. In one embodiment, the first CSI report may also be determined based at least in part on the performance of the receiving processor at the UE 20.

In some embodiments, the UE 20 may estimate, for the emulated interference signal, an effective channel based on a selected reference signal (box 50), and derive the emulated interference signal based at least in part on the estimated effective channel (box 52). The UE 20 may also determine the first CSI report assuming an interference hypothesis that is based on the modified measured interference (box 54). In another embodiment, the UE 20 may determine parts of the first CSI report based on the modified measured interference (box 56). In such embodiments, determining parts of the first CSI report comprises determining one of a transmission Rank Indicator (RI) a Precoder Matrix Indicator (PMI) and a Channel Quality Indicator (CQI), or determining a combination of any of the RI, PMI, and CQI.

The UE 20 is not limited to estimating only a single effective channel. In one embodiment, the UE 20 may estimate a plurality of effective channels. In such embodiments, the UE 20 would receive a plurality of reference signals, and therefore, each estimate may be based on an associated selected reference signal. Further, the UE 20 may also derive the emulated interference signal by deriving properties of a plurality of emulated interference signals. Each emulated interference signal could be based, at least in part, on an associated estimated effective channel.

Figure 6:
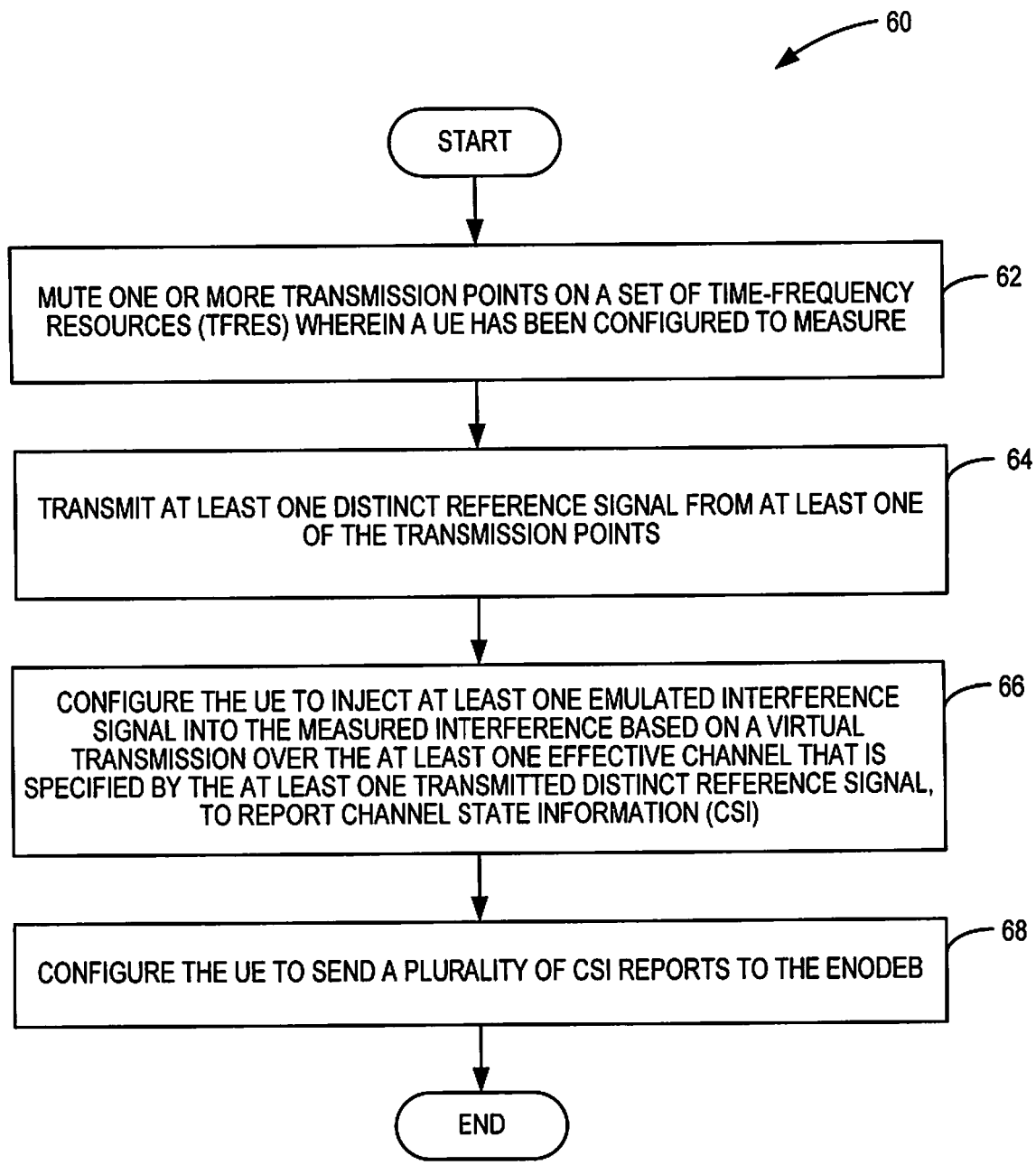
FIG. 6 is a flow diagram illustrating a method, performed at an eNodeB, for improving link adaptation in a wireless communications system according to one embodiment of the present disclosure.

FIG. 6 is a flow diagram illustrating a method 60 for improving link adaptation in a wireless communications system, such as system 10, according to another embodiment of the present disclosure. Method 60 is performed at the eNodeB 18 and begins with the eNodeB 18 muting one or more transmission points (TPs) on a set of TFREs that the UE 20 has been configured to measure by the eNodeB 18 (box 62). The eNodeB 18 then transmits a distinct reference signal from at least one of the TPs (box 64), and configures the UE 20 to inject an emulated interference signal into the measured interference signal based on a virtual transmission over the effective channel that is specified by the transmitted distinct reference signal, to report CSI (box 66).

In one embodiment, the eNodeB 18 then configures the UE 20 to send a plurality of CSI reports to the eNodeB (box 68). In such embodiments, each CSI report corresponds to a selected Coordinated MultiPoint (CoMP) transmission hypothesis in which the interference from each of the plurality of TPs, corresponding to the transmission hypothesis, is injected by the UE 20.

The present disclosure may, of course, be carried out in other ways than those specifically set forth herein without departing from essential characteristics of the disclosure. For example, although terminology from 3GPP LTE has been used in this disclosure to exemplify embodiments of the disclosure, those of ordinary skill in the art will readily appreciate that this if for illustrative purposes only, and that the present disclosure is not limited in scope to only the aforementioned system. Other wireless systems, including, but not limited to, WCDMA, WiMax, UMB and GSM, may also benefit from using the methods described herein.

Additionally, note that terminology such as eNodeB and UE is also non-limiting, and further, does not imply any particular hierarchical relation between the two. Generally, an "eNodeB" could be considered as a first device and an "UE" could be considered as a second device that communicates with each other over some radio channel. Further, although the description specifically focuses on wireless transmissions in the downlink, this is for illustrative purposes only. Those skilled in the art will readily appreciate that the present disclosure is equally applicable to wireless transmissions on the uplink.

Therefore, those of ordinary skill in the art will readily appreciate that the present embodiments is not limited by the foregoing discussion. Nor is it limited by the accompanying figures. Rather, the present disclosure is limited only by the following claims and their reasonable legal equivalents.

We claim:

1. A method for improving link adaptation in a wireless communication system, the method performed at a User Equipment, UE, and comprising:
   measuring interference on a set of time-frequency resources, TFREs, configured by an eNodeB;
   injecting at least one emulated interference signal into the measured interference to form a modified measured interference;
   determining a first Channel State Information, CSI, report based in part on the modified measured interference; and
   sending the first CSI report to the eNodeB.

2. The method of claim 1 further comprising:
   for the emulated interference signal, estimating an effective channel based on a selected reference signal; and
   deriving the emulated interference signal based, at least in part, on the estimated effective channel.

3. The method of claim 2 wherein the emulated interference signal comprises a virtual transmission of an isotropic random signal over the associated effective channel, and where the virtual transmission has an indicated nominal power.

4. The method of claim 2 where estimating comprises estimating a plurality of effective channels, each estimate based on an associated selected reference signal, and wherein deriving the emulated interference signal comprises deriving properties of a plurality of emulated interference signals, each based, at least in part, on an associated estimated effective channel.

5. The method of claim 2 wherein power measurement offsets are independently configurable for adding virtual interference, and for estimating the effective channel of a desired signal using a port associated with the reference signal.

6. The method claim 1 wherein the first CSI report is determined based at least in part on a performance of receiver processing at the UE.

7. The method of claim 1 further comprising determining the first CSI report assuming an interference hypothesis that is based on the modified measured interference, and that is modeled as at least one of:
   a complex-valued Gaussian process;
   according to a probability distribution that complies with a selected correlation matrix;
   as frequency selective; and
   as wideband with an expected power calculated over the entire bandwidth.

8. The method of claim 1 further comprising determining parts of the first CSI report based on the modified measured interference, wherein determining the parts of the first CSI report comprises determining one of a transmission Rank Indicator, RI, a Precoder Matrix Indicator, PMI, and a Channel Quality Indicator, CQI, or a combination of any of the RI, PMI, and CQI.

9. A User Equipment, UE, configured to improve link adaptation in a wireless communication system, the UE comprising:
   a communications interface configured to receive a reference signal transmitted by a plurality of transmission points over an effective channel using a set of time-frequency resources, TFREs, configured by an eNodeB, wherein a first transmission point is muted on the set of TFREs by the eNodeB; and
   a programmable controller configured to:
      measure interference on the set of TFREs configured by the eNodeB;
      inject at least one emulated interference signal into the measured interference to form a modified measured interference;
      determine a first Channel State Information, CSI, report based on the modified measured interference; and
      send the first CSI report to the eNodeB.

10. The UE of claim 9 wherein the controller is further configured to estimate the effective channel based on the transmitted reference signal, and derive the at least one emulated interference signal based, at least in part, on the estimated effective channel.

11. The UE of claim 9 wherein the at least one emulated interference signal comprises an isotropic random signal having a selected nominal power.

12. The UE of claim 9 wherein the controller is further configured to determine the first CSI report based at least in part on a receive performance of the communications interface.

13. The UE of claim 9 wherein the controller is further configured to:
   generate an interference hypothesis based on the measured interference;
   determine a second CSI report based on the interference hypothesis; and
   send the second CSI report to the eNodeB.

14. The UE of claim 9 wherein the controller is further configured to determine the first CSI report assuming an interference hypothesis that is based on the modified measured interference, and that is modeled as at least one of:
   a complex-valued Gaussian process;
   according to a probability distribution that complies with a selected correlation matrix;
   as frequency selective; and
   as wideband with an expected power calculated over the entire bandwidth.

15. The UE of claim 9 wherein the controller is further configured to inject a plurality of emulated interference signals into the measured interference to form the modified measured interference, each of the plurality of emulated interference signals comprising an isotropic random signal that is virtually transmitted over an associated estimated effective channel.

16. The UE of claim 9 wherein the controller is further configured to add a virtual interference signal from a selected effective channel having a specified reference signal for a selected CSI report.

17. The UE of claim 9 wherein the controller is further configured to determine parts of the first CSI report based on the modified measured interference by determining one of a transmission Rank Indicator, RI, a Precoder Matrix Indicator, PMI, and a Channel Quality Indicator, CQI, or a combination of any two of the RI, PMI, and CQI.

18. The UE of claim 17 wherein the controller is further configured to:
   determine a plurality of distinct interference hypotheses based on the modified measured interference; and
   determine different parts of the CSI report based on the plurality of distinct interference hypotheses.

19. The UE of claim 18 wherein each interference hypothesis corresponds to at least one of:
   the modified measured interference as modified by a different one of the plurality of emulated interference signals; and
   a different residual interference measurement.

20. The UE of claim 17 wherein at least one of the interference hypotheses corresponds to a measured interference that is not modified by an emulated interference signal.

21. The UE of claim 9 wherein the controller is further configured to independently configure a power measurement offset to add virtual interference, and to estimate the effective channel of a desired signal using a port associated with the reference signal.

22. The UE of claim 9 wherein at least one of the plurality of transmission points is muted by the eNodeB on a selected set of one or more TFREs, and wherein the controller is further configured to measure a residual interference on the selected set of one or more TFREs.

23. The UE of claim 22 wherein each of the plurality of transmission points are muted by the eNodeB, and wherein the controller is further configured to send a plurality of CSI reports to the eNodeB, each corresponding to a selected Coordinated MultiPoint, CoMP, transmission hypothesis in which the interference from each of the plurality of transmission points is injected by the UE.

24. A method for improving link adaptation in a wireless communication system, the method performed at an eNodeB and comprising:
   muting one or more transmission points on a set of time-frequency resources, TFREs, wherein a UE has been configured to measure interference on the set of TFREs;
   transmitting at least one distinct reference signal from at least one of the transmission points; and
   configuring the UE to inject at least one emulated interference signal into the measured interference based on a virtual transmission over the at least one effective channel that is specified by the at least one transmitted distinct reference signal, to report Channel State Information, CSI.

25. The method of claim 24 further comprising configuring the UE to send a plurality of CSI reports to the eNodeB each CSI report corresponding to a selected Coordinated MultiPoint, CoMP, transmission hypothesis in which the interference from each of the plurality of transmission points, corresponding to the transmission hypothesis, is injected by the UE.

26. An eNodeB configured to improve link adaptation in a wireless communication system, the eNodeB comprising:
   a communications interface configured to communicate with a UE via the wireless communication system; and
   a programmable controller operatively coupled to the communication interface and configured to:
      mute one or more transmission points on a set of time-frequency resources, TFREs, wherein the UE has been configured to measure interference on the set of TFREs;
      transmit at least one distinct reference signal from at least one of the transmission points; and
      configure the UE to inject at least one emulated interference signal into the measured interference based on a virtual transmission over the at least one effective channel that is specified by the at least one transmitted distinct reference signal, to report Channel State Information, CSI.

27. The eNodeB of claim 26 wherein the programmable controller is further configured to configure the UE to send a plurality of CSI reports to the eNodeB, each CSI report corresponding to a selected Coordinated MultiPoint, CoMP, transmission hypothesis in which the interference from each of the plurality of transmission points, corresponding to the transmission hypothesis, is injected by the UE.

* * * * *